US009882992B2

(12) United States Patent
Baldwin et al.

(10) Patent No.: US 9,882,992 B2
(45) Date of Patent: Jan. 30, 2018

(54) DATA SESSION HANDOFF USING BONE CONDUCTION

(71) Applicant: AT&T Intellectual Property I, L.P., Atlanta, GA (US)

(72) Inventors: Christopher Baldwin, Algonquin, IL (US); Brian S. Amento, Morris Plains, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 383 days.

(21) Appl. No.: 14/482,078

(22) Filed: Sep. 10, 2014

(65) Prior Publication Data

US 2016/0073296 A1    Mar. 10, 2016

(51) Int. Cl.
G06F 15/16    (2006.01)
H04L 29/08    (2006.01)
H04B 13/00    (2006.01)

(52) U.S. Cl.
CPC ......... *H04L 67/148* (2013.01); *H04B 13/005* (2013.01); *H04L 67/04* (2013.01)

(58) Field of Classification Search
CPC ....... H04L 67/148; H04B 13/005; H04W 4/16
USPC ...................................................... 709/205
See application file for complete search history.

(56) References Cited

U.S. PATENT DOCUMENTS

| | | |
|---|---|---|
| 3,629,521 A | 12/1971 | Puharich et al. |
| 4,048,986 A | 9/1977 | Ott |
| 4,340,778 A | 7/1982 | Cowans et al. |
| 4,421,119 A | 12/1983 | Pratt |
| 4,720,607 A | 1/1988 | de Moncuit |
| 4,754,763 A | 7/1988 | Doemland |
| 4,799,498 A | 1/1989 | Collier |
| 4,988,981 A | 1/1991 | Zimmerman et al. |
| 5,024,239 A | 6/1991 | Rosenstein |
| 5,073,950 A | 12/1991 | Colbert et al. |
| 5,125,313 A | 6/1992 | Hiyoshi et al. |
| 5,319,747 A | 6/1994 | Gerrissen et al. |

(Continued)

FOREIGN PATENT DOCUMENTS

| | | |
|---|---|---|
| AU | 2003257031 | 2/2004 |
| AU | 2007200415 | 8/2007 |

(Continued)

OTHER PUBLICATIONS

U.S. Office Action dated Aug. 25, 2015 in U.S. Appl. No. 11/586,142.

(Continued)

*Primary Examiner* — Nicholas Taylor
*Assistant Examiner* — Meng Vang
(74) *Attorney, Agent, or Firm* — Hartman & Citrin LLC

(57) ABSTRACT

Concepts and technologies are disclosed herein for data session handoff using bone conduction. According to one aspect, a first user device can receive a handoff request from a second user device. The handoff request can instruct the first user device to hand off an active data session to the second user device. The handoff request can be received by the first user device via a bone conduction signal that propagated through a bone of a user that is in physical contact with the first user device and the second user device. The first user device also can initiate handoff of the active data session to the second user device in response to the handoff request.

20 Claims, 10 Drawing Sheets

(56) References Cited

U.S. PATENT DOCUMENTS

| | | |
|---|---|---|
| 5,327,506 A | 7/1994 | Stites, III |
| 5,368,044 A | 11/1994 | Cain et al. |
| 5,495,241 A | 2/1996 | Doing et al. |
| 5,615,681 A | 4/1997 | Ohtomo |
| 5,664,227 A | 9/1997 | Mauldin et al. |
| 5,720,290 A | 2/1998 | Buhler |
| 5,749,363 A | 5/1998 | Ishii |
| 5,766,208 A | 6/1998 | Mcewan |
| 5,810,731 A | 9/1998 | Sarvazyan et al. |
| 5,813,406 A | 9/1998 | Kramer et al. |
| 5,836,876 A | 11/1998 | Dimarogonas |
| 6,024,711 A | 2/2000 | Lentle |
| 6,115,482 A | 9/2000 | Sears et al. |
| 6,135,951 A | 10/2000 | Richardson et al. |
| 6,151,208 A | 11/2000 | Bartlett |
| 6,154,199 A | 11/2000 | Butler |
| 6,213,934 B1 | 4/2001 | Bianco |
| 6,234,975 B1 | 5/2001 | Mcleod et al. |
| 6,336,045 B1 | 1/2002 | Brooks |
| 6,380,923 B1 | 4/2002 | Fukumoto |
| 6,396,930 B1 | 5/2002 | Vaudrey et al. |
| 6,409,684 B1 | 6/2002 | Wilk |
| 6,507,662 B1 | 1/2003 | Brooks |
| 6,515,669 B1 | 2/2003 | Mohri |
| 6,580,356 B1 | 6/2003 | Alt et al. |
| 6,589,287 B2 | 7/2003 | Lundborg |
| 6,631,197 B1 | 10/2003 | Taenzer |
| 6,754,472 B1 | 6/2004 | Williams et al. |
| 6,783,501 B2 | 8/2004 | Takahashi et al. |
| 6,844,660 B2 | 1/2005 | Scott |
| 6,898,299 B1 | 5/2005 | Brooks |
| 6,912,287 B1 | 6/2005 | Fukumoto et al. |
| 7,010,139 B1 | 3/2006 | Smeehuyzen |
| 7,123,752 B2 | 10/2006 | Kato et al. |
| 7,148,879 B2 | 12/2006 | Amento et al. |
| 7,198,607 B2 | 4/2007 | Jamsen |
| 7,206,423 B1 | 4/2007 | Feng et al. |
| 7,232,416 B2 | 6/2007 | Czernicki |
| 7,370,208 B2 | 5/2008 | Levin et al. |
| 7,405,725 B2 | 7/2008 | Mohri et al. |
| 7,536,557 B2 | 5/2009 | Murakami et al. |
| 7,539,533 B2 | 5/2009 | Tran |
| 7,615,018 B2 | 11/2009 | Nelson et al. |
| 7,625,315 B2 | 12/2009 | Hickman |
| 7,648,471 B2 | 1/2010 | Hobson |
| 7,671,351 B2 | 3/2010 | Setlak et al. |
| 7,708,697 B2 | 5/2010 | Wilkinson et al. |
| 7,760,918 B2 | 7/2010 | Bezvershenko et al. |
| 7,778,848 B1 | 8/2010 | Reeves |
| 7,796,771 B2 | 9/2010 | Calhoun et al. |
| 7,878,075 B2 | 2/2011 | Johansson et al. |
| 7,914,468 B2 | 3/2011 | Shalon et al. |
| 7,918,798 B2 | 4/2011 | Wu |
| 8,023,669 B2 | 9/2011 | Segev et al. |
| 8,023,676 B2 | 9/2011 | Abolfathi et al. |
| 8,031,046 B2 | 10/2011 | Franza et al. |
| 8,098,129 B2 | 1/2012 | Falck et al. |
| 8,196,470 B2 | 6/2012 | Gross et al. |
| 8,200,289 B2 | 6/2012 | Joo et al. |
| 8,253,693 B2 | 8/2012 | Buil et al. |
| 8,270,637 B2 | 9/2012 | Abolfathi |
| 8,270,638 B2 | 9/2012 | Abolfathi et al. |
| 8,312,660 B1 | 11/2012 | Fujisaki |
| 8,348,936 B2 | 1/2013 | Trembly et al. |
| 8,421,634 B2 | 4/2013 | Tan et al. |
| 8,467,742 B2 | 6/2013 | Hachisuka et al. |
| 8,482,488 B2 | 7/2013 | Jannard |
| 8,491,446 B2 | 7/2013 | Hinds et al. |
| 8,500,271 B2 | 8/2013 | Howell et al. |
| 8,521,239 B2 | 8/2013 | Hosoi et al. |
| 8,540,631 B2 | 9/2013 | Penner et al. |
| 8,542,095 B2 | 9/2013 | Kamei |
| 8,560,034 B1 | 10/2013 | Diab et al. |
| 8,594,568 B2 | 11/2013 | Falck |
| 8,750,852 B2 | 6/2014 | Forutanpour et al. |
| 8,922,427 B2 | 12/2014 | Dehnie et al. |
| 9,031,293 B2 | 5/2015 | Kalinli-Akbacak |
| 9,386,962 B2 | 7/2016 | Dahl |
| 2001/0013546 A1 | 8/2001 | Ross |
| 2001/0051776 A1 | 12/2001 | Lenhardt |
| 2003/0048915 A1 | 3/2003 | Bank |
| 2003/0066882 A1 | 4/2003 | Ross |
| 2003/0125017 A1 | 7/2003 | Greene et al. |
| 2003/0133008 A1 | 7/2003 | Stephenson |
| 2004/0152440 A1 | 8/2004 | Yoda et al. |
| 2005/0207599 A1 | 9/2005 | Fukumoto et al. |
| 2005/0210269 A1 | 9/2005 | Tiberg |
| 2006/0018488 A1 | 1/2006 | Viala et al. |
| 2006/0132455 A1 | 6/2006 | Rimas-Ribikauskus |
| 2006/0149337 A1 | 7/2006 | John |
| 2007/0012507 A1 | 1/2007 | Lyon |
| 2007/0142874 A1 | 6/2007 | John |
| 2008/0064955 A1 | 3/2008 | Miyajima |
| 2008/0084859 A1* | 4/2008 | Sullivan ............ H04W 36/0011 370/342 |
| 2008/0223925 A1 | 9/2008 | Saito et al. |
| 2008/0260211 A1 | 10/2008 | Bennett et al. |
| 2009/0149722 A1 | 6/2009 | Abolfathi et al. |
| 2009/0228791 A1 | 9/2009 | Kim |
| 2009/0234262 A1 | 9/2009 | Reid, Jr. et al. |
| 2009/0287485 A1 | 11/2009 | Glebe |
| 2009/0289958 A1 | 11/2009 | Kim et al. |
| 2009/0304210 A1 | 12/2009 | Weisman |
| 2009/0309751 A1 | 12/2009 | Kano et al. |
| 2010/0016741 A1 | 1/2010 | Mix et al. |
| 2010/0066664 A1 | 3/2010 | Son et al. |
| 2010/0137107 A1 | 6/2010 | Jamsa et al. |
| 2010/0162177 A1 | 6/2010 | Eves et al. |
| 2010/0168572 A1 | 7/2010 | Sliwa et al. |
| 2010/0286571 A1 | 11/2010 | Allum et al. |
| 2010/0297944 A1 | 11/2010 | Lee |
| 2010/0315206 A1 | 12/2010 | Schenk et al. |
| 2010/0316235 A1 | 12/2010 | Park et al. |
| 2010/0328033 A1 | 12/2010 | Kamei |
| 2011/0022025 A1 | 1/2011 | Savoie et al. |
| 2011/0125063 A1 | 5/2011 | Shalon et al. |
| 2011/0134030 A1 | 6/2011 | Cho |
| 2011/0135106 A1 | 6/2011 | Yehuday et al. |
| 2011/0137649 A1 | 6/2011 | Rasmussen et al. |
| 2011/0152637 A1 | 6/2011 | Kateraas et al. |
| 2011/0155479 A1 | 6/2011 | Oda |
| 2011/0227856 A1 | 9/2011 | Corroy et al. |
| 2011/0245669 A1 | 10/2011 | Zhang |
| 2011/0255702 A1 | 10/2011 | Jensen |
| 2011/0260830 A1 | 10/2011 | Weising |
| 2011/0269601 A1 | 11/2011 | Nelson et al. |
| 2011/0276312 A1 | 11/2011 | Shalon |
| 2011/0280239 A1* | 11/2011 | Tung ................ H04M 3/42246 370/352 |
| 2011/0282662 A1 | 11/2011 | Aonuma et al. |
| 2012/0010478 A1 | 1/2012 | Kinnunen et al. |
| 2012/0011990 A1 | 1/2012 | Mann |
| 2012/0058859 A1 | 3/2012 | Elsom-Cook et al. |
| 2012/0065477 A1 | 3/2012 | Enomoto |
| 2012/0065506 A1 | 3/2012 | Smith |
| 2012/0143693 A1 | 6/2012 | Chung et al. |
| 2012/0202479 A1 | 8/2012 | Sugitani et al. |
| 2012/0212441 A1 | 8/2012 | Christiansson et al. |
| 2012/0280900 A1 | 11/2012 | Wang et al. |
| 2012/0290832 A1 | 11/2012 | Antequera Rodriguez et al. |
| 2013/0034238 A1 | 2/2013 | Abolfathi |
| 2013/0041235 A1 | 2/2013 | Rogers et al. |
| 2013/0097292 A1* | 4/2013 | Yoakum ................ H04M 3/42 709/221 |
| 2013/0119133 A1 | 5/2013 | Michael et al. |
| 2013/0120458 A1 | 5/2013 | Celebisoy et al. |
| 2013/0135223 A1 | 5/2013 | Shai |
| 2013/0142363 A1* | 6/2013 | Amento ................ H04K 1/00 381/151 |
| 2013/0170471 A1* | 7/2013 | Nix ................ H04W 36/00 370/331 |
| 2013/0171599 A1 | 7/2013 | Bleich et al. |
| 2013/0173926 A1 | 7/2013 | Morese et al. |
| 2013/0212648 A1 | 8/2013 | Tietjen et al. |

(56) References Cited

U.S. PATENT DOCUMENTS

| | | | |
|---|---|---|---|
| 2013/0215060 A1 | 8/2013 | Nakamura | |
| 2013/0225915 A1 | 8/2013 | Redfield et al. | |
| 2013/0225940 A1 | 8/2013 | Fujita et al. | |
| 2013/0257804 A1 | 10/2013 | Vu et al. | |
| 2013/0278396 A1 | 10/2013 | Kimmel | |
| 2013/0288655 A1 | 10/2013 | Foruntanpour et al. | |
| 2013/0346620 A1 | 12/2013 | Gizis et al. | |
| 2014/0009262 A1 | 1/2014 | Robertson et al. | |
| 2014/0028604 A1 | 1/2014 | Morinaga et al. | |
| 2014/0035884 A1 | 2/2014 | Oh et al. | |
| 2014/0097608 A1 | 4/2014 | Buzhardt et al. | |
| 2014/0099991 A1 | 4/2014 | Cheng et al. | |
| 2014/0107531 A1 | 4/2014 | Baldwin | |
| 2014/0156854 A1* | 6/2014 | Gaetano, Jr. | H04L 65/1069 709/227 |
| 2014/0168093 A1 | 6/2014 | Lawrence | |
| 2014/0168135 A1 | 6/2014 | Saukko et al. | |
| 2014/0174174 A1 | 6/2014 | Uehara et al. | |
| 2014/0188561 A1 | 7/2014 | Tenbrock et al. | |
| 2014/0210791 A1 | 7/2014 | Hanauer et al. | |
| 2014/0240124 A1 | 8/2014 | Bychkov | |
| 2015/0084011 A1 | 3/2015 | Park et al. | |
| 2015/0092962 A1 | 4/2015 | Amento et al. | |
| 2015/0120465 A1 | 4/2015 | Baldwin et al. | |
| 2015/0128094 A1 | 5/2015 | Baldwin et al. | |
| 2015/0137936 A1 | 5/2015 | Baldwin et al. | |
| 2015/0137960 A1 | 5/2015 | Baldwin et al. | |
| 2015/0138062 A1 | 5/2015 | Baldwin et al. | |
| 2015/0150116 A1 | 5/2015 | Baldwin et al. | |
| 2015/0199950 A1 | 7/2015 | Heiman | |

FOREIGN PATENT DOCUMENTS

| | | |
|---|---|---|
| CA | 1207883 | 7/1986 |
| EP | 0712114 | 5/1996 |
| EP | 0921753 | 6/1999 |
| EP | 1436804 | 2/2004 |
| EP | 2312997 | 4/2011 |
| EP | 2643981 | 5/2012 |
| EP | 2483677 | 8/2012 |
| GB | 2226931 | 7/1990 |
| GB | 2348086 | 9/2000 |
| JP | 02249017 | 10/1990 |
| JP | 04-317638 A | 11/1992 |
| JP | 2003058190 | 2/2003 |
| JP | 2005142729 | 6/2005 |
| JP | 2010210730 | 9/2010 |
| KR | 20100056688 | 10/1990 |
| TW | 200946887 | 8/1997 |
| WO | WO 8201329 | 4/1982 |
| WO | WO 9601585 | 1/1996 |
| WO | WO 2003033882 | 4/2003 |
| WO | WO 2006094372 | 9/2006 |
| WO | WO 2009001881 | 12/2008 |
| WO | WO 2010045158 | 4/2010 |
| WO | WO 2012168534 | 12/2012 |

OTHER PUBLICATIONS

U.S. Office Action dated Aug. 25, 2015 in U.S. Appl. No. 14/083,094.
U.S. Office Action dated Jun. 25, 2015 in U.S. Appl. No. 14/083,110.
U.S. Appl. No. 14/482,087, filed Sep. 10, 2014.
U.S. Appl. No. 14/482,091, filed Sep. 10, 2014.
U.S. Appl. No. 14/482,101, filed Sep. 10, 2014.
U.S. Appl. No. 14/482,658, filed Oct. 15, 2014.
U.S. Office Action dated Dec. 17, 2015 in U.S. Appl. No. 14/065,663.
U.S. Office Action dated Nov. 19, 2015 in U.S. Appl. No. 14/083,499.
U.S. Office Action dated Nov. 19, 2015 in U.S. Appl. No. 14/090,668.
U.S. Office Action dated Jan. 11, 2016 in U.S. Appl. No. 14/514,658.
U.S. Office Action dated Feb. 25, 2016 in U.S. Appl. No. 14/072,126.
U.S. Notice of Allowance dated Apr. 4, 2016 in U.S. Appl. No. 14/083,499.
U.S. Notice of Allowance dated Mar. 21, 2016 in U.S. Appl. No. 14/090,668.
U.S. Office Action dated Mar. 16, 2016 in U.S. Appl. No. 14/482,087.
U.S. Office Action dated Mar. 10, 2016 in U.S. Appl. No. 14/482,091.
U.S. Office Action dated Jul. 7, 2016 in U.S. Appl. No. 14/072,126.
U.S. Notice of Allowance dated Jul. 12, 2016 in U.S. Appl. No. 14/482,091.
U.S. Office Action dated Aug. 17, 2016 in U.S. Appl. No. 15/161,499.
U.S. Office Action dated Sep. 14, 2016 in U.S. Appl. No. 14/482,101.
U.S. Notice of Allowance dated Oct. 7, 2016 in U.S. Appl. No. 15/224,808.
U.S. Office Action dated Mar. 8, 2010 in U.S. Appl. No. 11/586,142.
U.S. Office Action dated Aug. 12, 2010 in U.S. Appl. No. 11/586,142.
Examiner's Answer to Appeal Brief dated Apr. 22, 2011 in U.S. Appl. No. 11/586,142.
Patent Board Decision on Appeal dated Sep. 25, 2014 in U.S. Appl. No. 11/586,142.
Notice of Allowance dated Dec. 18, 2014 in U.S. Appl. No. 11/586,142.
Harrison et al., "Acoustic Barcodes: Passive, Durable and Inexpensive Notched Identification Tags," Proceedings of the 25$^{th}$ Annual ACM Symposium on User Interface Software and Technology, Oct. 7-10, 2012, ACM, Cambridge, MA.
YOO et al., "Analysis of Body Sensor Network Using Human Body as the Channel," Proceedings of the ICST 3$^{rd}$ International Conference on Body Area Networks, 2008, Institute for Computer Sciences, Social-Informatics and Telecommunications Engineering.
Harrison et al., "Skinput: Appropriating the Body as an Input Surface," Proceedings of the SIGCHI Conference on Human Factors in Computing Systems, Apr. 10-15, 2010, ACM, Atlanta, GA.
Mujibiya et al., "The Sound of Touch: On-body Touch and Gesture Sensing Based on Transdermal Ultrasound Propagation," Proceedings of the 2013 ACM International Conference on Interactive Tabletops and Surfaces, Oct. 6-9, 2013, ACM, St. Andrews, United Kingdom.
Ni et al., "Disappearing Mobile Devices," Proceedings of the 22$^{nd}$ Annual ACM Symposium on User Interface Software and Technology, Oct. 4-7, 2009, ACM, Victoria, British Columbia, Canada.
Zhong et al., "OsteoConduct: Wireless Body-Area Communication based on Bone Conduction," Proceeding of the ICST 2nd International Conference on Body Area Networks, BodyNets 2007.
Travis et al., "Hambone: A bio-acoustic gesture interface," 2007 11th IEEE International Symposium on Wearable Computers, 2007.
Scanlon, Michael V. Acoustic sensor for health status monitoring. Army Research Lab Aberdeen Proving Ground MD, 1998.
Yamada, Guillaume Lopez; Masaki Shuzo; Ichiro. "New healthcare society supported by wearable sensors and information mapping-based services." International Journal of Networking and Virtual Organisations 9.3 (2011): 233-247.
Scanlon, Michael V. "Acoustic sensors in the helmet detect voice and physiology." AeroSense 2003. International Society for Optics and Photonics, 2003.
Amento et al., "The Sound of One Hand: A Wrist-Mounted Bio-Acoustic Fingertip Gesture Interface," Short Talk: It's All About Sound, CHI 2002.
"Kinect Gestures," retrieved from http://support.xbox.com/en-US/xbox-360/kinect/body-controller on Oct. 24, 2013.
Mark Billinghurst, "Chapter 14: Gesture Based Interaction," Haptic Input, Aug. 24, 2011.
Kompis, Martin, and Rudolf Haeusler, "Electromagnetic interference of bone-anchored hearing aids by cellular phones revisited," Acta oto-laryngologica 122.5, 2002, 510-512.

(56) References Cited

OTHER PUBLICATIONS

T. Scott Saponas, et al., "Enabling always-available input with muscle-computer interfaces," Proceedings of the 22nd Annual ACM Symposium on User Interface Software and Technology, ACM, 2009.

Jao Henrique Donker, "The Body as a communication medium," 2009.

Sang-Yoon Chang, et al., "Body Area Network Security: Robust Key Establishment Using Human Body Channel," retrieved from https://www.usenix.org/system/files/conference/healthsec12/healthsec12-final15.pdf on Oct. 16, 2013.

Vidya Bharrgavi, et al., "Security Solution for Data Integrity in Wireless BioSensor Networks," Distributed Computing Systems Workshops, 2007, ICDSW'07, 27th International Conference, IEEE, 2007.

Daniel Halperin, et al., "Pacemakers and Implantable Cardiac Defibrillators: Software Radio Attacks and Zero-Power Defenses," Security and Privacy, SP 2008, IEEE Symposium, IEEE, 2008.

Carmen C. Y. Poon, et al., "A Novel Biometrics Method to Secure Wireless Body Area Sensor Networks for Telemedicine and M-Health," Communications Magazine, IEEE 44.4, 2006, 73-81.

Zicheng Liu, et al., "Direct Filtering for Air-and Bone-Conductive Microphones," Multimedia Signal Processing, 2004 IEEE 6th Workshop, IEEE, 2004.

Hinckley, Ken, and Hyunyoung Song, "Sensor synaesthesia: touch in motion, and motion in touch." Proceedings of the SIGCHI Conference on Human Factors in Computing Systems. ACM, 2011.

Hinge, Dhanashree, and S. D. Sawarkar. "Mobile to Mobile data transfer through Human Area Network." IJRCCT 2.11 (2013): 1181-1184.

Park, Duck Gun, et al. "TAP: touch-and-play." Proceedings of the SIGCHI conference on Human Factors in computing systems. ACM, 2006.

Ruiz, J. Agud, and Shigeru Shimamoto. "A study on the transmission characteristics of the human body towards broadband intrabody communications." Consumer Electronics, 2005.(ISCE 2005). Proceedings of the Ninth International Symposium on. IEEE, 2005.

Nagai, Ryoji, et al. "Near-Field Coupling Communication Technology for Human-Area Networking." Proc. Conf. on Information and Communication Technologies and Applications (ICTA2011), International Institute of Informatics and Systems (IIIS). 2012.

Lipkova, Jolana, and Jaroslav Cechak. "Transmission of Information Using the Human Body."

Maruf, Md Hasan. "An Input Amplifier for Body-Channel Communication." (2013).

Rekimoto, Jun. "Gesturewrist and gesturepad: Unobtrusive wearable interaction devices." Wearable Computers, 2001. Proceedings. Fifth International Symposium on. IEEE, 2001.

U.S. Office Action dated Feb. 13, 2013 in U.S. Appl. No. 13/309,124.

U.S. Office Action dated Sep. 24, 2013 in U.S. Appl. No. 13/309,124.

U.S. Office Action dated Jan. 29, 2014 in U.S. Appl. No. 13/309,124.

U.S. Office Action dated Dec. 14, 2016 in U.S. Appl. No. 14/561,549.

U.S. Office Action dated Apr. 7, 2017 in U.S. Appl. No. 14/065,663.

U.S. Notice of Allowance dated Aug. 21, 2017 in U.S. Appl. No. 14/065,663.

U.S. Office Action dated May 10, 2017 in U.S. Appl. No. 15/161,499.

U.S. Notice of Allowance dated Mar. 28, 2017 in U.S. Appl. No. 15/224,808.

U.S. Office Action dated Apr. 21, 2017 in U.S. Appl. No. 15/450,624.

U.S. Notice of Allowance dated Aug. 22, 2017 in U.S. Appl. No. 15/450,624.

U.S. Notice of Allowance dated Nov. 17, 2017 in U.S. Appl. No. 14/482,101.

U.S. Office Action dated Dec. 13, 2017 in U.S. Appl. No. 15/250,375.

Fukumoto et al., "Whisper: A Wristwatch Style Wearable Headset," CHI 99, pp. 112-119.

Fukumoto et al., "Body Coupled FingeRing Wireless Wearable Keyboard," CHI 97, Mar. 1997, pp. 147-154.

Matsushita et al., "Wearable Key Device for Personalizing Nearby Environment, Proceedings of the Fourth International Symposium on Wearable Computers" (ISWC'00), Feb. 2000, pp. 1-8.

\* cited by examiner

DATA SESSION HANDOFF USING BONE CONDUCTION

BACKGROUND

Bone conduction is a developing communication technology with numerous potential applications. By using the body of a user as a communication medium, interactions with systems and devices can become much more natural and intuitive.

SUMMARY

Concepts and technologies are disclosed herein for data session handoff using bone conduction. According to one aspect of the concepts and technologies disclosed herein, a first user device can receive a handoff request from a second user device. The handoff request can instruct the first user device to hand off an active data session to the second user device. The handoff request can be received by the first user device via a bone conduction signal that propagated through a bone of a user that is in physical contact with the first user device and the second user device. The first user device also can initiate handoff of the active data session to the second user device in response to the handoff request. In some embodiments, the handoff request includes an address of the second user device. The address can be, but is not limited to, an internet protocol ("IP") address.

In some embodiments, the first user device can forward the address to a network along with a command to transition the active data session to the second user device via the address. The network can receive the command to transition the active data session to the second user device and the network can route the active data session to the second user device via the address.

In some embodiments, the first user device can forward the address to a source along with a command to transition the active data session to the second user device via the address. The source can provide data associated with the active data session. The source can receive the command to transition the active data session to the second user device, and the source can route the active data session to the second user device via the address.

In some embodiments, the first user device can forward the active data session to the second user device via a wireless connection established between the first user device and the second user device. In some other embodiments, the first user device can forward the active data session to the second user device via a further bone conduction signal that propagates through the bone of the user.

In some embodiments, the first user device can forward a source address of a source to the second user device via a wireless connection established between the first user device and the second user device. The source can provide data associated with the active data session. The second user device can contact the source via the source address and can request that the source handoff the active data session to the second user device via the address.

In some embodiments, the first user device can forward a source address of a source to the second user device via a further bone conduction signal that propagates through the bone of the user. The source can provide data associated with the active data session. The second user device can contact the source via the source address and can request that the source handoff the active data session to the second user device via the address.

According to another aspect, a user device can include a network component, a transducer, a processor, and a memory. The memory can store instructions that, when executed by the processor, cause the processor to perform operations. The operations can include the user device receiving, via the transducer, a handoff request from a further user device via a bone conduction signal that propagated through a bone of the user that is in physical contact with the user device and the further user device. The handoff request can instruct the user device to handoff an active data session to the further user device. The operations also can include the user device initiating handoff of the active data session to the second user device in response to the handoff request. In some embodiments, the handoff request can include an address of the further user device.

According to another aspect, a user device can detect via a sensor that a user is in physical contact with the user device. The user device can generate a handoff request. The handoff request can include an address of the user device and an instruction directed to a further user device. The instruction can instruct the further user device to cause an active data session to be handed off to the user device. The user device can send, by a transducer, the handoff request to the further user device via a bone conduction signal that propagates through a bone of the user. The user device can receive handoff of the active data session from the further user device.

In some embodiments, the user device can receive the handoff of the active data session from a network. In some other embodiments, the user device can receive the handoff of the active data session from a source. The source can provide data associated with the active data session.

In some embodiments, the user device can receive, by a network component, handoff of the active data session via a wireless connection established between the user device and the further user device. In some other embodiments, the user device can receive, by the transducer, handoff of the active data session via a further bone conduction signal that propagates through the bone of the user.

In some embodiments, the user device can receive a source address from the further user device, can contact a source of the active data session via the source address, and can request that the source hand off the active data session to the user device. In these embodiments, the user device can receive the source address from the further user device via a wireless connection established between the user device and the further user device. In these embodiments, the user device alternatively can receive the source address from the further user device via a further bone conduction signal that propagates through the bone of the user.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
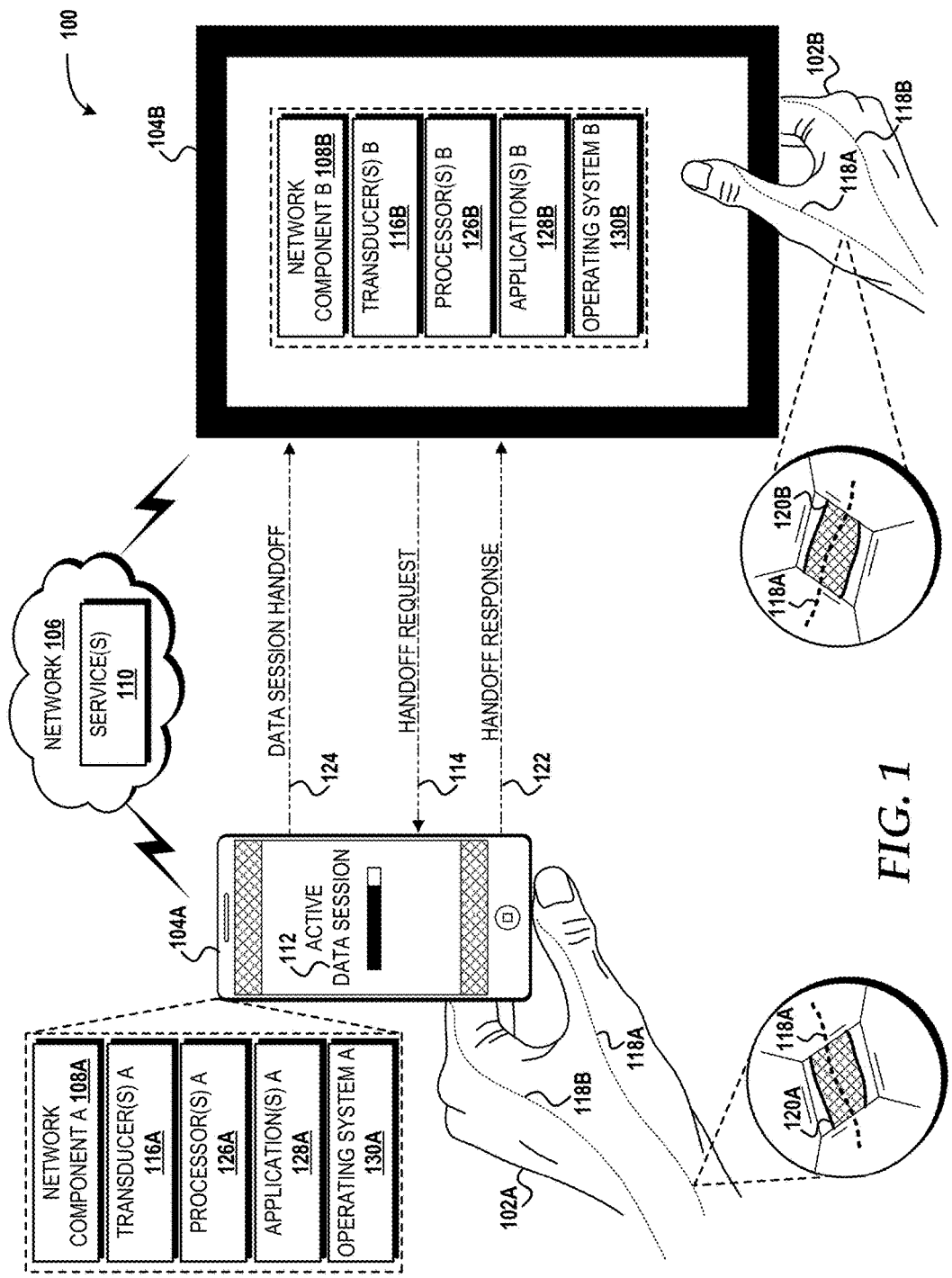
FIG. 1 is a diagram illustrating aspects of an illustrative operating environment for various concepts disclosed herein, according to an illustrative embodiment.

Bone conduction is a developing communication technology with numerous potential applications. By using the body of a user as a communication medium, interactions with systems and devices can become more natural and more intuitive than traditional communication mediums. For example, transferring media streams from one device to another, such as transferring an in-progress voice call from a mobile device to a fixed line home phone, using, at least in part, bone conduction concepts and technologies, can provide a seamless user experience in which the user's interaction with the devices is minimized.

With the proposed transition from circuit-switched technology to packet-switched technology in the wireline world (est. 2017-2020), and the introduction of voice over Internet protocol ("VoIP") in the form of voice over long term evolution ("VoLTE") in the mobility world (2014), the ability to transfer media streams between different systems and devices can also enable new innovations. An example of this is a VoLTE call on a smartphone transitioning to a video call session on a tablet device when a user arrives at home. This transition can be made intuitive and can be initiated simply by picking up the tablet device as will be detailed herein. Moreover, bone conduction concepts and technologies as described herein can help support service provider goals of providing seamless and effortless transitioning of media streams from a home WI-FI connection to a cellular connection, and vice versa.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of data session hand-off using bone conduction will be presented.

Referring now to FIG. 1, aspects of an operating environment 100 in which various embodiments presented herein may be implemented will be described, according to an illustrative embodiment. The illustrated operating environment 100 includes a user's first hand 102A and a user's second hand 102B. The user's first hand 102A is shown holding a user device A 104A. The user's second hand 102B is shown holding a user device B 104B.

The user device A 104A, in some embodiments, is or includes a desktop, laptop computer, a notebook computer, a tablet device, a netbook computer, a mobile telephone, a smartphone, a feature phone, a video game system, a handheld video game system, a set-top box, a vehicle computing system, a smart watch, a personal fitness tracker, a safety device, a wearable device, a music playback device, a video playback device, an internet appliance, a television, a personal digital assistant ("PDA"), combinations thereof, or the like. The user device B 104B, in some embodiments, is or includes a desktop, laptop computer, a notebook computer, a tablet computer, a netbook computer, a mobile telephone, a smartphone, a feature phone, a video game system, a handheld video game system, a set-top box, a vehicle computing system, a smart watch, a personal fitness tracker, a safety device, a wearable device, a music playback device, a video playback device, an internet appliance, a television, a PDA, combinations thereof, or the like. It should be understood that the functionality of the user device A 104A and/or the functionality of the user device B 104B can be provided by a single device, by two or more similar devices, and/or by two or more dissimilar devices.

In the illustrated example, the user device A 104A and the user device B 104B are each in communication with a network 106. The network 106, in some embodiments, can be or can include one or more wireless personal area networks ("WPANs"), one or more wireless local area networks ("WLANs"), one or more wireless wide area networks ("WWANS"), one or more wireless metropolitan area networks ("WMANs"), one or more campus area networks ("CANs"), and/or one or more packet data networks, such as the internet or a portion thereof.

The network 106 may use any wireless communications technology or combination of wireless communications technologies, some examples of which include, but are not limited to, BLUETOOTH, ZIGBEE, WI-FI, WI-FI peer-to-peer, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other Institute of Electrical and Electronics Engineers ("IEEE") 802.XX technologies, and the like.

The network 106 embodied, at least in part, as a WWAN may operate using various channel access methods (which may or may not be used by the aforementioned technologies), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like. Data may be exchanged via the communications network using cellular data technologies such as, but not limited to, General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies.

The user device A 104A and the user device B 104B can access the network 106 via a network component A 108A and a network component B 108B, respectively. The network components A-B 108A-108B can each be or can each include one or more transceivers. The transceiver(s), if included, can be configured to communicate over the same and/or different wireless technology standards. For example, in some embodiments, the transceiver(s) may be configured to communicate using GSM, CDMA, CDMAONE, CDMA2000, LTE, and various other 2G, 2.5G, 3G, 4G, and greater generation technology standards. Moreover, the transceiver(s) may facilitate communications over various channel access methods (which may or may not be used by the aforementioned standards) including, but not limited to, TDMA, FDMA, W-CDMA, OFDM, SDMA, and the like.

The network components A-B 108A-108B may facilitate data communications using GPRS, EDGE, the HSPA protocol family, including HSDPA, EUL or otherwise termed HSUPA, HSPA+, and various other current and future wireless data access standards. The network components 108A-108B may include one or more transceivers for supporting other types and/or standards of communications, such as, for example, WI-FI, WIMAX, BLUETOOTH, infrared, infrared data association ("IRDA"), near-field communications ("NFC"), ZIGBEE, other RF technologies, combinations thereof, and the like.

The network 106 can provide the user devices 104A-104B access to one or more services 110. The service(s) 110 can be any service(s) that is accessible via a network connection. For example, the service(s) 110 can be or can include a voice call service, a VoIP service, a VoLTE service, a video call service, a media streaming service (e.g., a music or video service), a media download service, a web service, a local service (e.g., a local storage service), a data storage service, a television service, any combination thereof, and the like.

In the illustrated example, the user device A 104A is currently involved in an active data session 112 with the service 110 via the network 106. The active data session 112 can include the transmission of one or more data packets to the network 106 and/or the receipt of one or more data packets from the network 106 in support of the service(s) 110 being provided, at least in part, to the user device A 104A. When the user comes into contact with the user device B 104B, the user device B 104B can detect that the user is in contact with the user device B 104B using one or more sensors (best shown in FIG. 8), such as, for example, a touch sensor, an accelerometer, or a gyroscope sensor, although other sensors known to those skilled in the art may be used to detect that the user device B 104B is being contacted by the user. In response to detecting that the user is in contact with the user device B 104B, the user device B 104B can generate a handoff request 114. The handoff request 114 can be used by the user device B 104B to acquire status information regarding any active data sessions among other user devices with which the user is in contact, such as the user device A 104A in the illustrated example. In particular, the handoff request 114 can include one or more addresses for handing off the active data session 112 from the user device A 104A to the user device B 104B as will be described in greater detail below with reference to FIGS. 2-7.

In some embodiments, the user device B 104B can utilize one or more transducers B 116B to generate vibrations in accordance with one or more signals that have been modulated to encode the handoff request 114 (hereinafter "vibration signals 118A-118B"). The vibration signals 118A-118B can propagate through the user's body, and more particularly, through one or more bones 120A-120B of the user's body, to the user device A 104A via bone conduction to one or more transducers A 116A of the user device A 104A.

The transducers A-B 116A-116B, in some embodiments, are piezoelectric transducers, such as contact microphones or other electro-acoustic transducers. The transducers A-B 116A-116B can be built-in to the user device A 104A and the user device B 104B, respectively, although other implementations are contemplated.

In response to the handoff request 114, the user device A 104A can generate a handoff response 122. The handoff response 122 can include information that is to be used by the user device B 104B for a data session handoff 124 during which the active data session 112 is handed off by the user device A 104A to the user device B 104B. Additional details in this regard are provided herein below with reference to FIGS. 2-7.

In some embodiments, the handoff request 114 and/or the handoff response 122 can provide one or more security features so that the data session handoff 124 cannot be compromised. For example, the handoff request 114 may include a passcode or other security mechanism to identify the user device B 104B to the user device A 104A. The handoff response 122 may additionally or alternatively include a security mechanism. In some embodiments, the user device A 104A and the user device B 104B can be authenticated to each other using the methods described in U.S. patent application Ser. No. 13/309,124, which is assigned to the Assignee of this application, and which is hereby incorporated by reference in its entirety.

In the illustrated example, the user device A 104A and the user device B 104B each include, respectively, one or more processors A, B 126A, 126B, one or more applications A, B 128A, 128B, and an operating system A, B 130A, 130B. The user device A 104A and the user device B 104B can execute, via the processors A, B 126A, 126B, respectively, the application(s) A, B 128A, 128B. The application(s) A, B 128A, 128B can include, but are not limited to, productivity applications, entertainment applications, video applications, music applications, video game applications, camera applications, messaging applications, social network applications, enterprise applications, map applications, security applications, presence applications, visual voice mail applications, text-to-speech applications, speech-to-text applications, email applications, calendar applications, camera applications, web browser applications, and the like. The application(s) A, B 128A, 128B can execute on top of the operating system A, B 130A, 130B, respectively. The operating system A, B 130A, 130B can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

Figure 2:
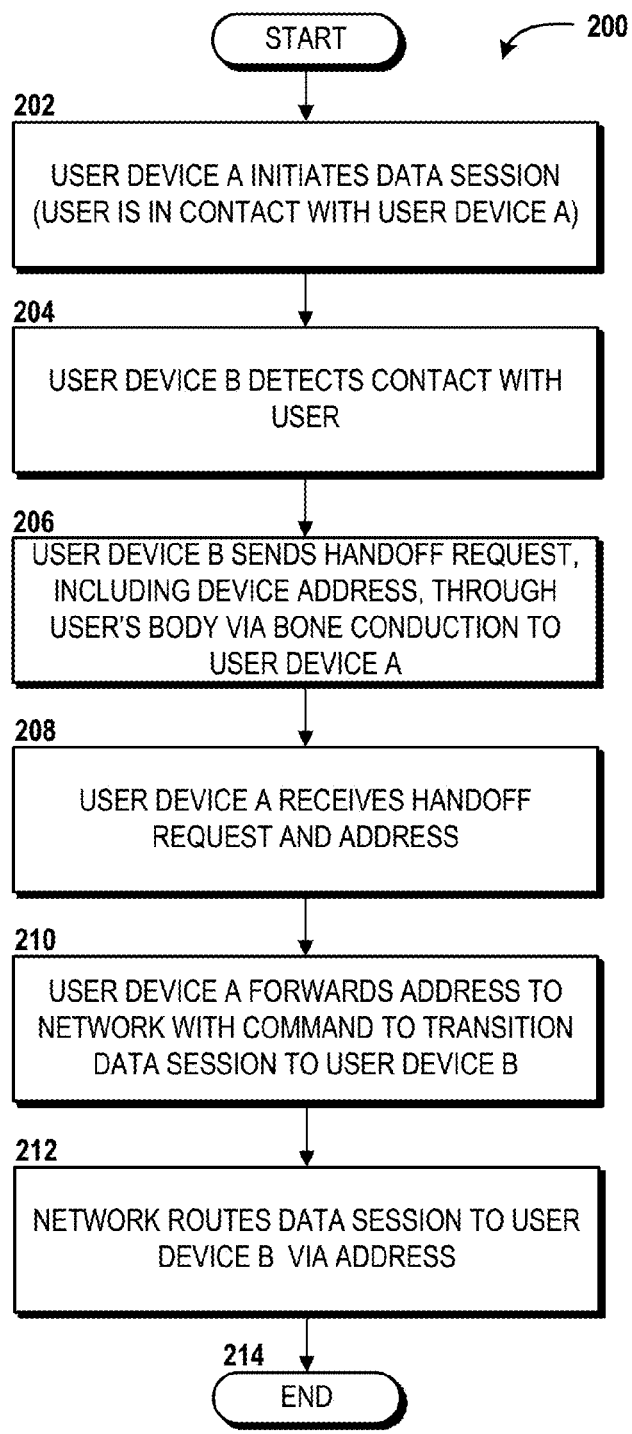
FIG. 2 is a flow diagram illustrating aspects of a method for performing a data session handoff, according to an illustrative embodiment.

Turning now to FIG. 2, aspects of a method 200 for performing the data session handoff 124 (shown in FIG. 1) will be described, according to an illustrative embodiment. It should be understood that the operations of the methods are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in their respective entireties. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including the user device A 104A, the user device B 104B, single-processor or multiprocessor systems, minicomputers, mainframe computers, personal computers, hand-held computing devices, microprocessor-based, programmable consumer electronics, other devices and systems disclosed herein, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof refers to causing one or more processors, such as the processor(s) A 126A of the user device A 104A, the processor(s) B 126B of the user device B 104B, or one or more processors of another device disclosed herein, or another system disclosed herein, to perform one or more operations and/or causing the processor to direct other components of the computing system or device to perform one or more of the operations.

For purposes of illustrating and describing some of the concepts of the present disclosure, the methods disclosed herein are described as being performed, at least in part, by the user device A 104A and/or the user device B 104B, via execution, by the processor(s) A, B 126A, 126B, of one or more software modules and/or software applications, such as, for example, the application(s) A, B 128A, 128B, and/or the operating system(s) A, B 130A, 130B. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIG. 1. The method 200 begins at operation 202, where the user device A 104A initiates a data session (hereinafter "the active data session 112") with the service(s) 110. It should be noted that the user is in contact with the user device A 104A, such as the user holding the user device A 104A with the user's hand 102A as the example shown in FIG. 1.

From operation 202, the method 200 proceeds to operation 204, where the user device B 104B detects contact with the user. For example, the user device B 104B can detect contact with the user via one or more sensors (best shown in FIG. 8), such as a touch sensor, an accelerometer, or a gyroscope sensor, although other sensors are contemplated.

From operation 204, the method 200 proceeds to operation 206, where the user device B 104B sends, via the transducer(s) B 116B, the handoff request 114, including a device address associated with the user device B 104B, through the user's body, and more particularly through one or more of the user's bones (e.g., the bones 120A, 120B shown in FIG. 1) of the user's body, to the user device A 104A. From operation 206, the method 200 proceeds to operation 208, where the user device A 104A receives, via the transducer(s) A 116A, the handoff request 114 including the device address associated with the user device B 104B.

From operation 208, the method 200 proceeds to operation 210, where the user device A 104A forwards the device address to the network 106 with a command to transition the active data session 112 to the user device B 104B. From operation 210, the method 200 proceeds to operation 212, where the network 106 receives the command from the user device A 104A and routes the active data session 112 to the user device B 104B using the device address.

From operation 212, the method 200 proceeds to operation 214. The method 200 ends at operation 214.

Figure 3:
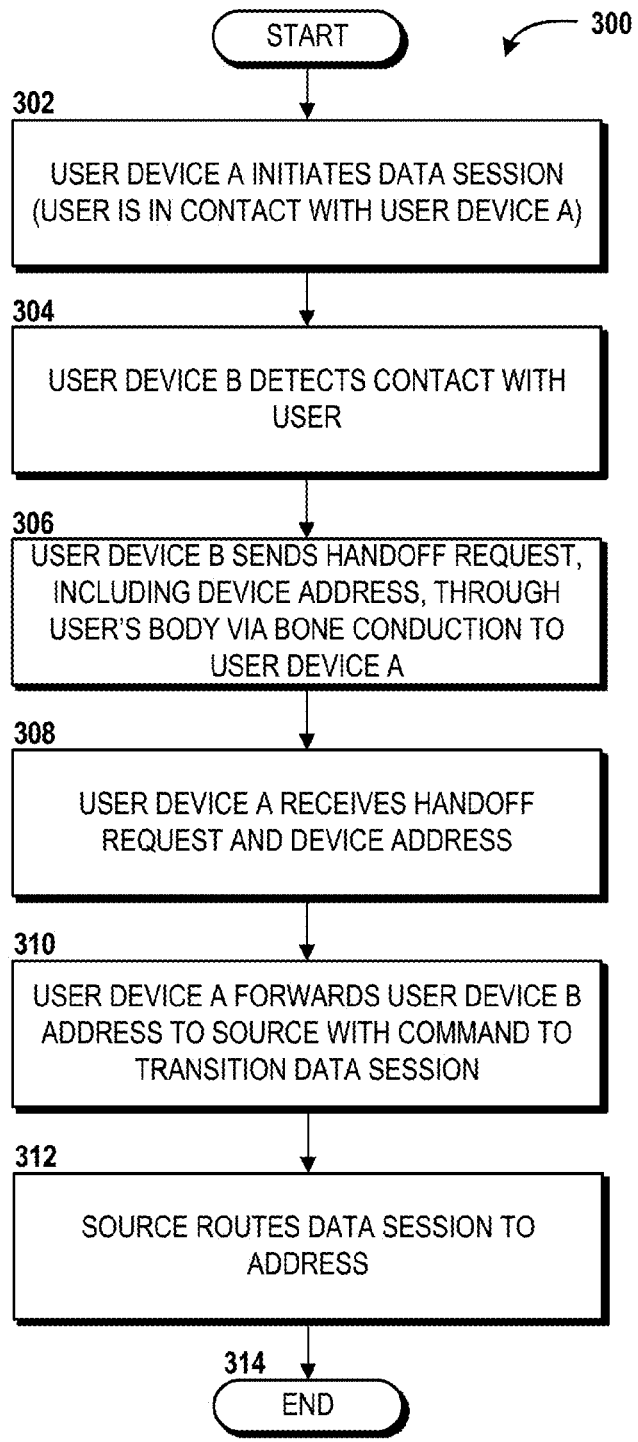
FIG. 3 is a flow diagram illustrating aspects of another method for performing a data session handoff, according to an illustrative embodiment.

Turning now to FIG. 3, aspects of a method 300 for performing the data session handoff 124 (shown in FIG. 1) will be described in detail, according to an illustrative embodiment. The method 300 will be described with reference to FIG. 3 and further reference to FIG. 1. The method 300 begins at operation 302, where the user device A 104A initiates a data session (hereinafter "the active data session 112") with the service(s) 110. It should be noted that the user is in contact with the user device A 104A, such as the user holding the user device A 104A with the user's hand 102A as the example shown in FIG. 1.

From operation 302, the method 300 proceeds to operation 304, where the user device B 104B detects contact with the user. For example, the user device B 104B can detect contact with the user via one or more sensors (best shown in FIG. 8), such as a touch sensor, an accelerometer, or a gyroscope sensor, although other sensors are contemplated.

From operation 304, the method 300 proceeds to operation 306, where the user device B 104B sends, via the transducer(s) B 116B, the handoff request 114, including a device address associated with the user device B 104B, through the user's body, and more particularly one or more of the user's bones (e.g., the bones 120A, 120B shown in FIG. 1) of the user's body, to the user device A 104A. From operation 306, the method 300 proceeds to operation 308, where the user device A 104A receives, via the transducer(s) A 116A, the handoff request 114 including the device address associated with the user device B 104B.

From operation 308, the method 300 proceeds to operation 310, where the user device A 104A forwards the device address to a source with a command to transition the active data session 112 to the user device B 104B. The source can be a source of data associated with the active data session 112. The source can be, for example, one or more application servers, other servers, devices, systems, or other components that provide, at least in part, one or more of the services 110 (shown in FIG. 1). From operation 310, the method 300 proceeds to operation 312, where the source receives the command from the user device A 104A and routes the active data session 112 to the user device B 104B using the device address.

From operation 312, the method 300 proceeds to operation 314. The method 300 ends at operation 314.

Figure 4:
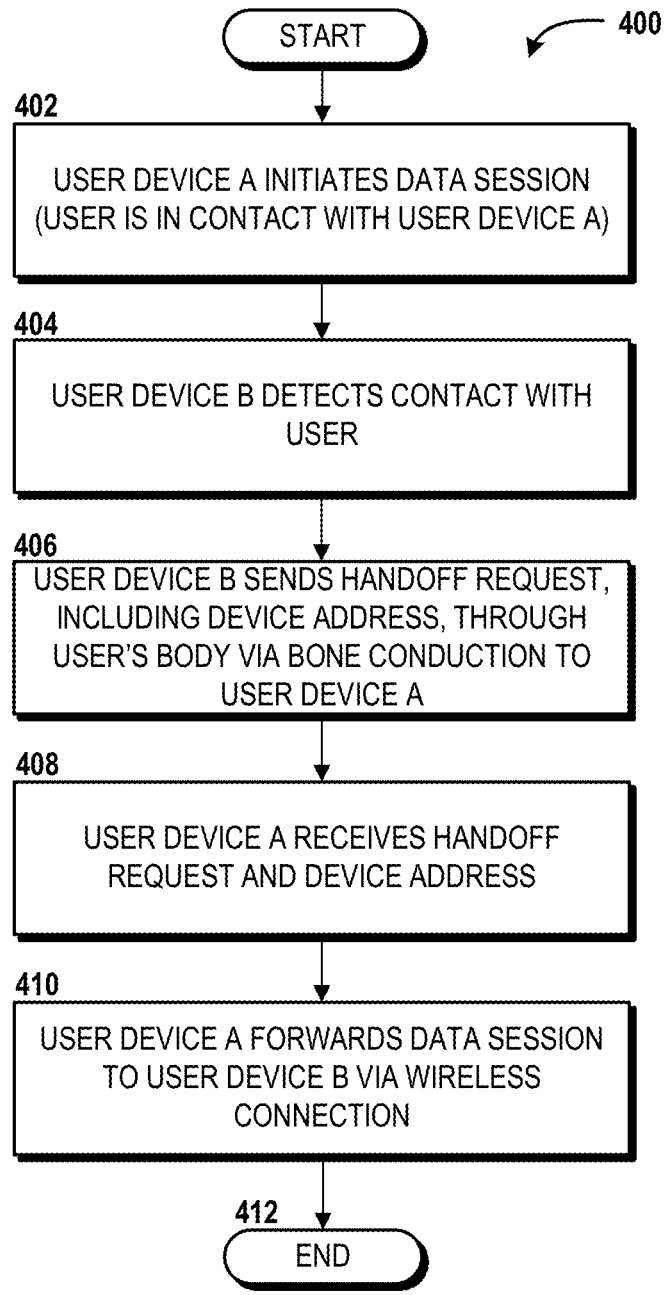
FIG. 4 is a flow diagram illustrating aspects of another method for performing a data session handoff, according to an illustrative embodiment.

Turning now to FIG. 4, aspects of a method 400 for performing the data session handoff 124 (shown in FIG. 1) will be described in detail, according to an illustrative embodiment. The method 400 will be described with reference to FIG. 4 and further reference to FIG. 1. The method 400 begins at operation 402, where the user device A 104A initiates a data session (hereinafter "the active data session 112") with the service(s) 110. It should be noted that the user is in contact with the user device A 104A, such as the user holding the user device A 104A with the user's hand 102A as the example shown in FIG. 1.

From operation 402, the method 400 proceeds to operation 404, where the user device B 104B detects contact with the user. For example, the user device B 104B can detect contact with the user via one or more sensors (best shown in FIG. 8), such as a touch sensor, an accelerometer, or a gyroscope sensor, although other sensors are contemplated.

From operation 404, the method 400 proceeds to operation 406, where the user device B 104B sends, via the transducer(s) B 116B, the handoff request 114, including a device address associated with the user device B 104B, through the user's body, and more particularly one or more of the user's bones (e.g., the bones 120A, 120B shown in FIG. 1) of the user's body, to the user device A 104A. From operation 406, the method 400 proceeds to operation 408, where the user device A 104A receives, via the transducer(s) A 116A, the handoff request 114 including the device address associated with the user device B 104B.

From operation 408, the method 400 proceeds to operation 410, where the user device A 104A forwards the active data session 112 to the user device B 104B, via the wireless connection, using the device address included in the handoff request 114 from the user device B 104B. The wireless connection may be implemented via BLUETOOTH, WI-FI, ZIGBEE, NFC, or any other wireless connection. Although a wireless connection is described, a wired connection alternatively may be established between the user device A 104A and the user device B 104B. The wired connection may be implemented, at least in part, via universal serial bus ("USB"), IEEE 1384 ("FIREWIRE"), a serial protocol, a parallel protocol, Ethernet (RJ45), RJ11, a proprietary protocol, combinations thereof, or the like.

From operation 410, the method 400 proceeds to operation 412. The method 400 ends at operation 412.

Figure 5:
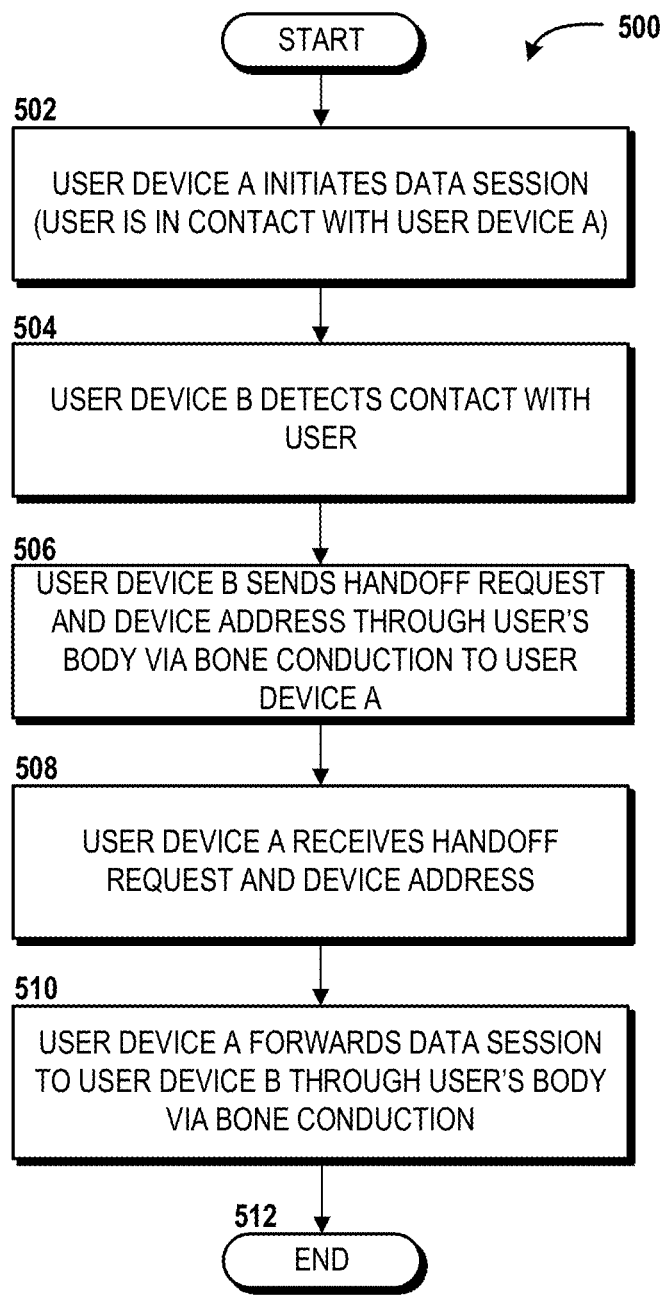
FIG. 5 is a flow diagram illustrating aspects of another method for performing a data session handoff, according to an illustrative embodiment.

Turning now to FIG. 5, aspects of a method 500 for performing the data session handoff 124 (shown in FIG. 1) will be described in detail, according to an illustrative embodiment. The method 500 will be described with reference to FIG. 5 and further reference to FIG. 1. The method 500 begins at operation 502, where the user device A 104A initiates a data session (hereinafter "the active data session 112") with the service(s) 110. It should be noted that the user is in contact with the user device A 104A, such as the user holding the user device A 104A with the user's hand 102A as the example shown in FIG. 1.

From operation 502, the method 500 proceeds to operation 504, where the user device B 104B detects contact with the user. For example, the user device B 104B can detect contact with the user via one or more sensors (best shown in FIG. 8), such as a touch sensor, an accelerometer, or a gyroscope sensor, although other sensors are contemplated.

From operation 504, the method 500 proceeds to operation 506, where the user device B 104B sends, via the transducer(s) B 116B, the handoff request 114, including a device address associated with the user device B 104B, through the user's body, and more particularly one or more of the user's bones (e.g., the bones 120A, 120B shown in FIG. 1) of the user's body, to the user device A 104A. From operation 506, the method 500 proceeds to operation 508, where the user device A 104A receives, via the transducer(s) A 116A, the handoff request 114 including the device address associated with the user device B 104B.

From operation 508, the method 500 proceeds to operation 510, where the user device A 104A forwards the active data session 112 to the user device B 104B through the user's body, and more particularly one or more of the user's bones (e.g., the bones 120A, 120B shown in FIG. 1) of the user's body. From operation 510, the method 500 proceeds to operation 512. The method 500 ends at operation 512.

Figure 6:
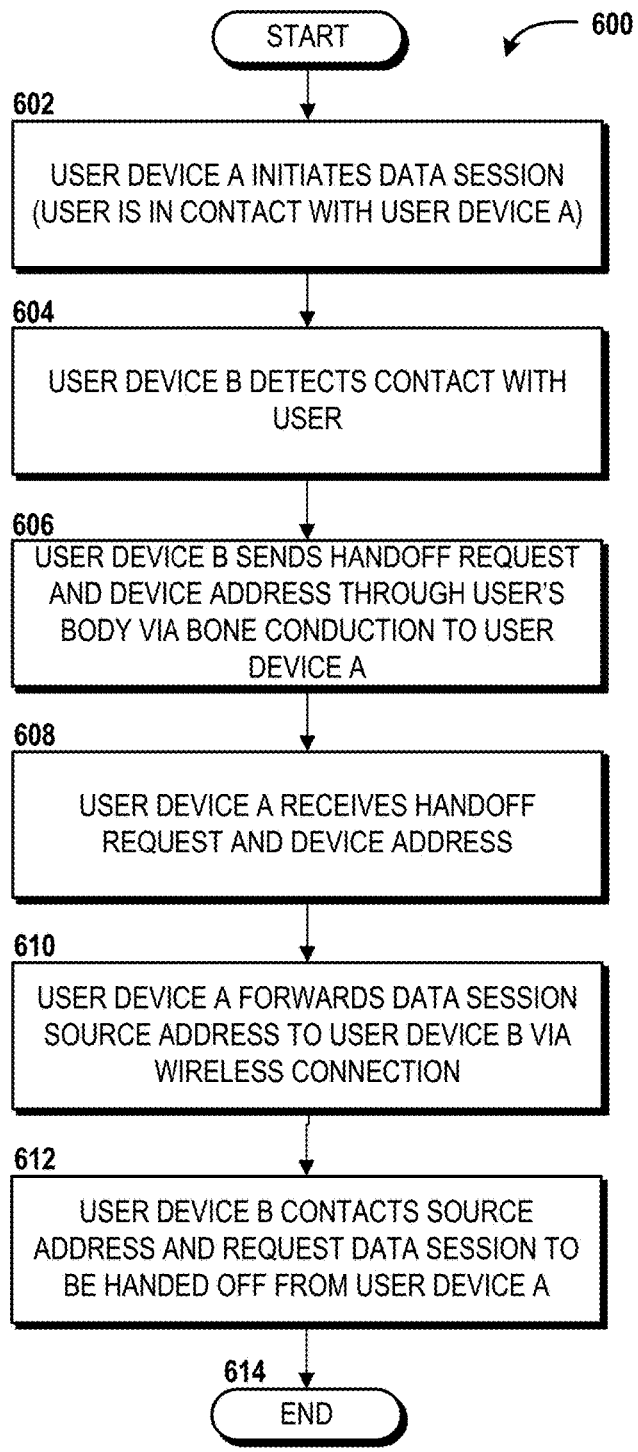
FIG. 6 is a flow diagram illustrating aspects of another method for performing a data session handoff, according to an illustrative embodiment.

Turning now to FIG. 6, aspects of a method 600 for performing the data session handoff 124 (shown in FIG. 1) will be described in detail, according to an illustrative embodiment. The method 600 will be described with reference to FIG. 6 and further reference to FIG. 1. The method 600 begins at operation 602, where the user device A 104A initiates a data session (hereinafter "the active data session 112") with the service(s) 110. It should be noted that the user is in contact with the user device A 104A, such as the user holding the user device A 104A with the user's hand 102A as the example shown in FIG. 1.

From operation 602, the method 600 proceeds to operation 604, where the user device B 104B detects contact with the user. For example, the user device B 104B can detect contact with the user via one or more sensors (best shown in FIG. 8), such as a touch sensor, an accelerometer, or a gyroscope sensor, although other sensors are contemplated.

From operation 604, the method 600 proceeds to operation 606, where the user device B 104B sends, via the transducer(s) B 116B, the handoff request 114, including a device address associated with the user device B 104B, through the user's body, and more particularly one or more of the user's bones (e.g., the bones 120A, 120B shown in FIG. 1), to the user device A 104A. From operation 606, the method 600 proceeds to operation 608, where the user device A 104A receives, via the transducer(s) A 116A, the handoff request 114 and the device address associated with the user device B 104B.

From operation 608, the method 600 proceeds to operation 610, where the user device A 104A forwards a source address for the active data session 112 to the user device B 104B via a wireless connection. The wireless connection may be implemented via BLUETOOTH, WI-FI, ZIGBEE, NFC, or any other wireless connection. Although a wireless connection is described, a wired connection alternatively may be established between the user device A 104A and the user device B 104B. The wired connection may be implemented, at least in part, via USB, IEEE 1384 ("FIREWIRE"), a serial protocol, a parallel protocol, Ethernet (RJ45), RJ11, a proprietary protocol, combinations thereof, or the like.

From operation 610, the method 600 proceeds to operation 612, where the user device B 104B contacts the source address and requests that the active data session 112 be handed off from the user device A 104A to the user device B 104B.

From operation 612, the method 600 proceeds to operation 614. The method 600 ends at operation 614.

Figure 7:
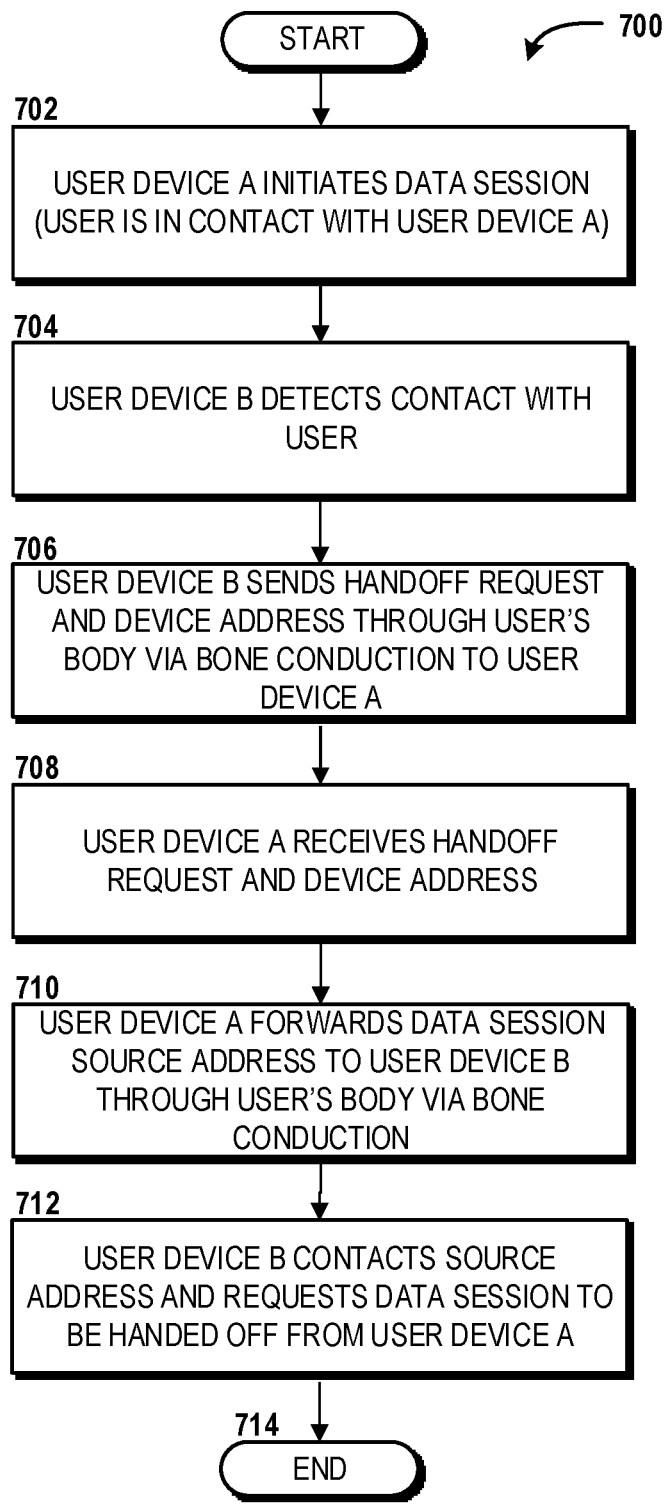
FIG. 7 is a flow diagram illustrating aspects of another method for performing a data session handoff, according to an illustrative embodiment.

Turning now to FIG. 7, aspects of a method 700 for performing the data session handoff 124 (shown in FIG. 1) will be described in detail, according to an illustrative embodiment. The method 700 will be described with reference to FIG. 7 and further reference to FIG. 1. The method 700 begins at operation 702, where the user device A 104A initiates a data session (hereinafter "the active data session 112") with the service(s) 110. It should be noted that the user is in contact with the user device A 104A, such as the user holding the user device A 104A with the user's hand 102A as the example shown in FIG. 1.

From operation 702, the method 700 proceeds to operation 704, where the user device B 104B detects contact with the user. For example, the user device B 104B can detect contact with the user via one or more sensors (best shown in FIG. 8), such as a touch sensor, an accelerometer, or a gyroscope sensor, although other sensors are contemplated.

From operation 704, the method 700 proceeds to operation 706, where the user device B 104B sends, via the transducer(s) B 116B, the handoff request 114, including a device address associated with the user device B 104B, through the user's body, and more particularly one or more of the user's bones (e.g., the bones 120A, 120B shown in FIG. 1), to the user device A 104A. From operation 706, the method 700 proceeds to operation 708, where the user device A 104A receives, via the transducer(s) A 116A, the handoff request 114 and the device address associated with the user device B 104B.

From operation 708, the method 700 proceeds to operation 710, where the user device A 104A forwards a source address for the active data session 112 to the user device B 104B through the user's body, and more particularly one or more of the user's bones (e.g., the bones 120A, 120B shown in FIG. 1).

From operation 710, the method 700 proceeds to operation 712, where the user device B 104B contacts the source associated with the source address and requests that the active data session 112 be handed off from the user device A 104A to the user device B 104B.

From operation 712, the method 700 proceeds to operation 714. The method 700 ends at operation 714.

Figure 8:
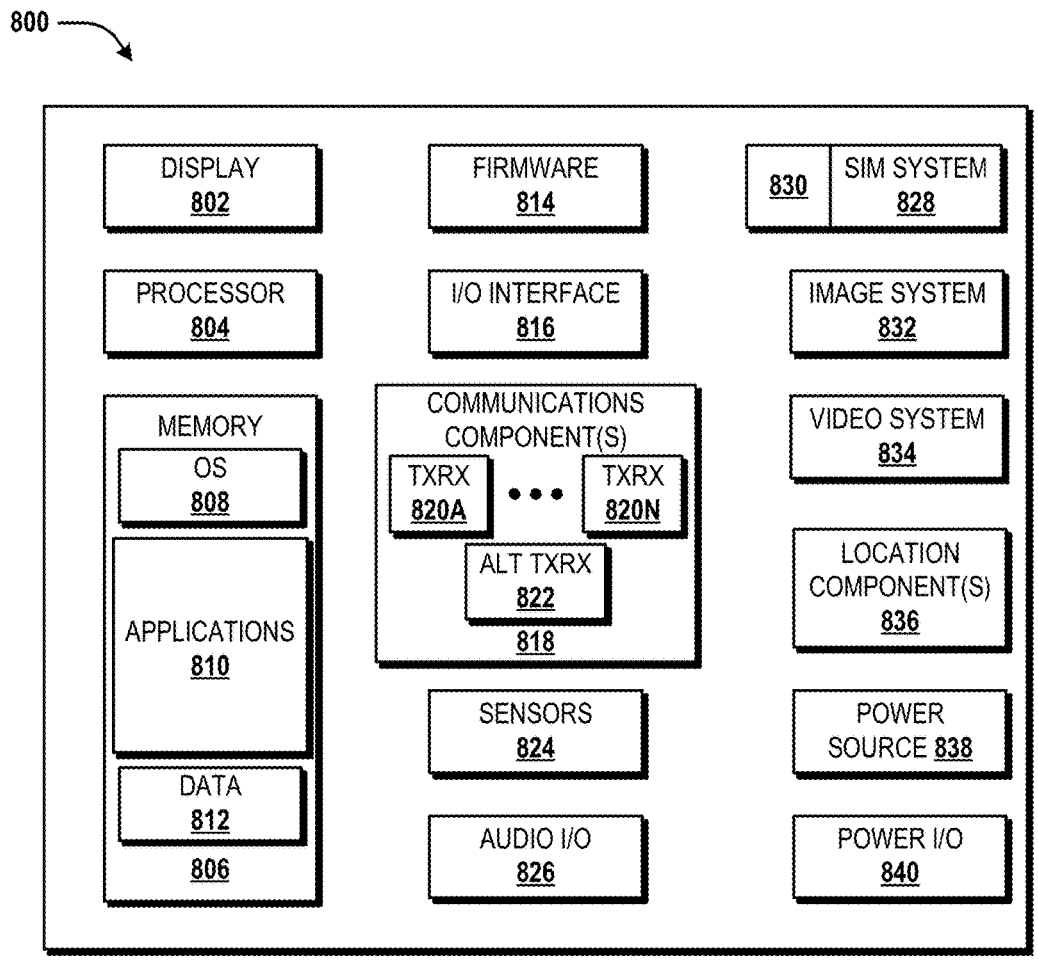
FIG. 8 is a block diagram illustrating an example mobile device capable of implementing aspects of the embodiments disclosed herein.

Turning now to FIG. 8, an illustrative mobile device 800 and components thereof will be described. In some embodiments, the user devices 104A, 104B described above can be configured as and/or can have an architecture similar or identical to the mobile device 800 described herein in FIG. 8. It should be understood, however, that the user devices 104A, 104B may or may not include the functionality described herein with reference to FIG. 8. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements, text, images, video, advertisements, various prompts, virtual keypads and/or keyboards, messaging data, notification messages, metadata, internet content, device status, time, date, calendar data, device preferences, map and location data, combinations thereof, and the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808 (e.g., the operating system 130A, 130B), one or more applications 810 (e.g., the application(s) 128A, 128B), other computer-executable instructions stored in a memory 806, or the like. In some embodiments, the applications 810 also can include a UI application (not illustrated in FIG. 8).

The UI application can interface with the operating system 808 to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, viewing account information, answering/initiating calls, entering/deleting data, entering and setting user IDs and passwords for device access, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include user preferences, user settings, and/or other data. The applications 810 can include, for example, the application(s) 128A, 128B, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, user information, organization information, presence status information, user IDs, passwords, and application initiation (start-up) requests. In some embodiments, the I/O interface 816 can include a hardwire connection such as USB port, a mini-USB port, a micro-USB port, an audio jack, a PS2 port, an IEEE 1384 ("FIREWIRE") port, a serial port, a parallel port, an Ethernet (RJ45) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 106 described above herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using Global System for Mobile communication ("GSM"), Code Division Multiple Access ("CDMA"), CDMAONE, CDMA2000, Long-Term Evolution ("LTE"), and various other 2G, 2.5G, 3G, 4G, and greater generation technology standards. Moreover, the communications component 818 may facilitate communications over various channel access methods (which may or may not be used by the aforementioned standards) including, but not limited to, Time Division Multiple Access ("TDMA"), Frequency Division Multiple Access ("FDMA"), Wideband CDMA ("W-CDMA"), Orthogonal Frequency-Division multiplexing ("OFDM"), Space-Division Multiple Access ("SDMA"), and the like.

In addition, the communications component 818 may facilitate data communications using Generic Packet Radio Service ("GPRS"), Enhanced Date Rates for GSM Evolution ("EDGE"), the High-Speed Packet Access ("HSPA") protocol family, including High-Speed Downlink Packet Access ("HSDPA"), Enhanced Uplink ("EUL") or otherwise termed Highs-Speed Uplink Packet Access ("HSUPA"), HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, IRDA, NFC, other RF technologies, combinations thereof, and the like.

In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Figure 9:
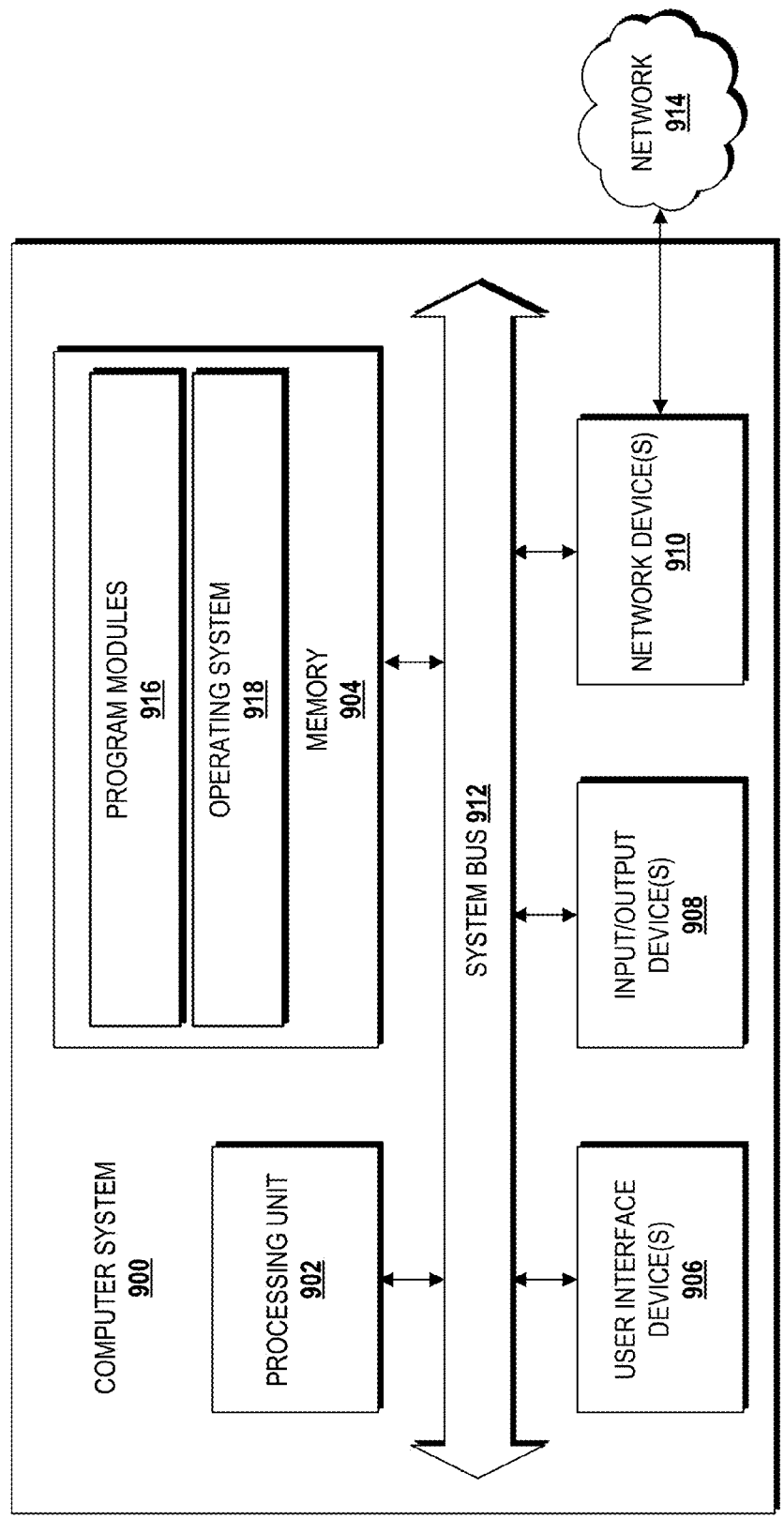
FIG. 9 is a block diagram illustrating an example computer system capable of implementing aspects of the embodiments presented herein.

FIG. 9 is a block diagram illustrating a computer system 900 configured to provide the functionality in accordance with various embodiments of the concepts and technologies disclosed herein. In some implementations, the user devices 104A, 104B are configured to utilize an architecture that is the same as or similar to the architecture of the computer system 900. In some implementations, one or more computer systems that provide, at least in part, the service(s) 110 are configured to utilize an architecture that is the same as or similar to the architecture of the computer system 900. It should be understood, however, that modification to the architecture may be made to facilitate certain interactions among elements described herein.

The computer system 900 includes a processing unit 902, a memory 904, one or more user interface devices 906, one or more input/output ("I/O") devices 908, and one or more network devices 910, each of which is operatively connected to a system bus 912. The bus 912 enables bi-directional communication between the processing unit 902, the memory 904, the user interface devices 906, the I/O devices 908, and the network devices 910.

The processing unit 902 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 904 communicates with the processing unit 902 via the system bus 912. In some embodiments, the memory 904 is operatively connected to a memory controller (not shown) that enables communication with the processing unit 902 via the system bus 912. The memory 904 includes an operating system 918 (e.g., the operating system 918) and one or more program modules 916. The operating system 918 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 916 may include various software and/or program modules to perform the various operations described herein. The program modules 916 can include, for example, the application(s) 128A, 128B. The program modules 916 and/or other programs can be embodied in computer-readable media containing instructions that, when executed by the processing unit 902, perform one or more of the operations described herein. According to embodiments, the program modules 916 may be embodied in hardware, software, firmware, or any combination thereof. The memory 904 can store other data, if desired.

By way of example, and not limitation, computer-readable media may include any available computer storage media or communication media that can be accessed by the computer system 900. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 900. In the claims, the phrase "computer storage medium" and variations thereof does not include waves or signals per se and/or communication media.

The user interface devices 906 may include one or more devices with which a user accesses the computer system 900. The user interface devices 906 may include, but are not limited to, computers, servers, personal digital assistants, cellular phones, or any suitable computing devices. The I/O devices 908 enable a user to interface with the program modules 916. In one embodiment, the I/O devices 908 are operatively connected to an I/O controller (not shown) that enables communication with the processing unit 902 via the system bus 912. The I/O devices 908 may include one or more input devices, such as, but not limited to, a keyboard, a mouse, or an electronic stylus. Further, the I/O devices 908 may include one or more output devices, such as, but not limited to, a display screen or a printer.

The network devices 910 enable the computer system 900 to communicate with other networks or remote systems via a network 914, such as the network 106. Examples of the network devices 910 include, but are not limited to, a modem, a radio frequency ("RF") or IR transceiver, a telephonic interface, a bridge, a router, or a network card. The network 914 may include a wireless network such as, but not limited to, a WLAN, a WWAN, a WPAN such as provided via BLUETOOTH technology, a WMAN such as a WiMAX network or metropolitan cellular network. Alternatively, the network 914 may be a wired network such as, but not limited to, a WAN, a wired LAN such as provided via Ethernet, a PAN, or a wired MAN.

Figure 10:
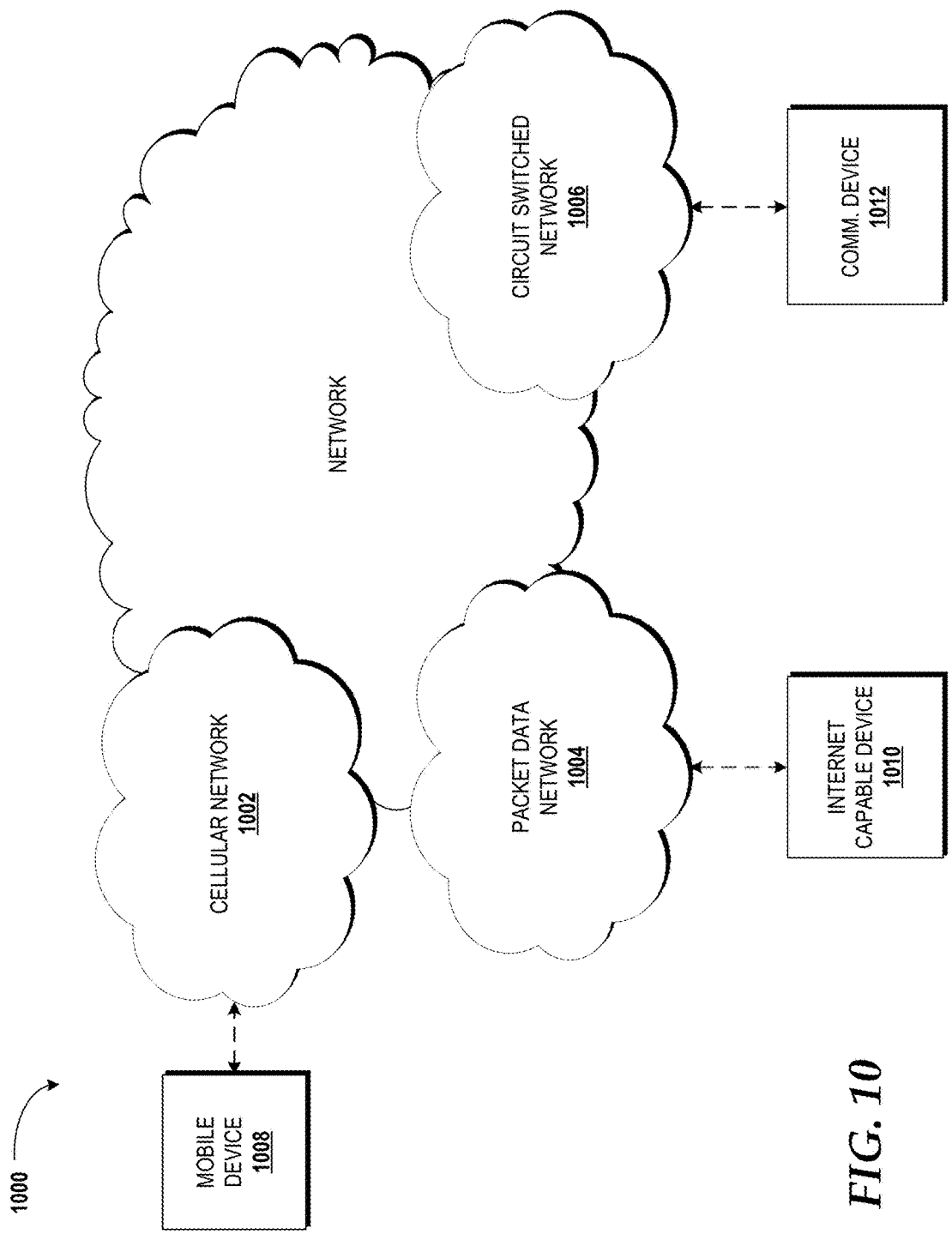
FIG. 10 schematically illustrates a network, according to an illustrative embodiment.

Turning now to FIG. 10, details of a network 1000 will be described, according to an illustrative embodiment. The network 1000 can include the network 106. The network 1000 includes a cellular network 1002, a packet data network 1004, for example, the Internet, and a circuit switched network 1006, for example, a publicly switched telephone network ("PSTN"). The cellular network 1002 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1002 also includes radios and nodes for receiving and transmitting voice, data, and combinations thereof to and from radio transceivers, networks, the packet data network 1004, and the circuit switched network 1006.

A mobile communications device 1008, such as, for example, a cellular telephone, a user equipment, a mobile terminal, a PDA, a laptop computer, a handheld computer, the user device A 104A, the user device B 104B, and combinations thereof, can be operatively connected to the cellular network 1002. The cellular network 1002 can be configured as a 2G GSM network and can provide data communications via GPRS and/or EDGE. Additionally, or alternatively, the cellular network 1002 can be configured as a 3G UMTS network and can provide data communications via the HSPA protocol family, for example, HSDPA, EUL (also referred to as HSUPA), and HSPA+. The cellular network 1002 also is compatible with 4G mobile communications standards such as LTE, or the like, as well as evolved and future mobile standards.

The packet data network 1004 includes various devices, for example, servers, computers, databases, and other devices in communication with one another, as is generally known. The packet data network 1004 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1004 includes or is in communication with the Internet. The circuit switched network 1006 includes various hardware and software for providing circuit switched communications. The circuit switched network 1006 may include, or may be, what is often referred to as a plain old telephone system ("POTS"). The functionality of a circuit switched network 1006 or other circuit-switched network are generally known and will not be described herein in detail.

The illustrated cellular network 1002 is shown in communication with the packet data network 1004 and a circuit switched network 1006, though it should be appreciated that this is not necessarily the case. One or more Internet-capable devices 1010, for example, the user devices 104A, 104B, a PC, a laptop, a portable device, or another suitable device, can communicate with one or more cellular networks 1002, and devices connected thereto, through the packet data network 1004. It also should be appreciated that the Internet-capable device 1010 can communicate with the packet data network 1004 through the circuit switched network 1006, the cellular network 1002, and/or via other networks (not illustrated).

As illustrated, a communications device 1012, for example, a telephone, facsimile machine, modem, computer, the user device A 104A, the user device B 104B, or the like, can be in communication with the circuit switched network 1006, and therethrough to the packet data network 1004 and/or the cellular network 1002. It should be appreciated that the communications device 1012 can be an Internet-capable device, and can be substantially similar to the Internet-capable device 1010.

Based on the foregoing, it should be appreciated that concepts and technologies directed to data session hand-off using bone conduction have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
receiving, by a first user device in physical contact with a user, a handoff request from a second user device also in physical contact with the user, wherein the first user device is in an active data session with a service via a network, wherein the handoff request comprises an address of the second user device and further comprises an instruction instructing the first user device to handoff the active data session to the second user device, wherein the second user device generates the handoff request in response to detecting, via a sensor of the second user device, that the second user device is in physical contact with the user, and wherein the handoff request is received by the first user device via a bone conduction signal that is sent by a transducer of the second user device and that is propagated through a bone of the user in physical contact with the first user device and the second user device; and
initiating, by the first user device, handoff of the active data session to the second user device in response to the handoff request.

2. The method of claim 1, wherein initiating, by the first user device, handoff of the active data session to the second user device in response to the handoff request comprises forwarding, by the first user device, the address to the network with a command to transition the active data session to the second user device via the address; and wherein the network receives the command to transition the active data session to the second user device, and the network routes the active data session to the second user device via the address.

3. The method of claim 1, wherein initiating, by the first user device, handoff of the active data session to the second user device in response to the handoff request comprises forwarding, by the first user device, the address to a source with a command to transition the active data session to the second user device via the address; wherein the source provides data associated with the active data session; and wherein the source receives the command to transition the active data session to the second user device, and the source routes the active data session to the second user device via the address.

4. The method of claim 1, wherein initiating, by the first user device, handoff of the active data session to the second user device in response to the handoff request comprises forwarding, by the first user device, the active data session to the second user device via a wireless connection established between the first user device and the second user device.

5. The method of claim 1, wherein initiating, by the first user device, handoff of the active data session to the second user device in response to the handoff request comprises forwarding, by the first user device, the active data session to the second user device via a further bone conduction signal that propagates through the bone of the user.

6. The method of claim 1, wherein initiating, by the first user device, handoff of the active data session to the second user device in response to the handoff request comprises forwarding, by the first user device, a source address of a source to the second user device via a wireless connection established between the first user device and the second user device; wherein the source provides data associated with the active data session; and wherein the second user device contacts the source via the source address and requests that the source handoff the active data session to the second user device via the address.

7. The method of claim 1, wherein initiating, by the first user device, handoff of the active data session to the second user device in response to the handoff request comprises forwarding, by the first user device, a source address of a source to the second user device via a further bone conduction signal that propagates through the bone of the user; wherein the source provides data associated with the active data session; and wherein the second user device contacts the source via the source address and requests that the source handoff the active data session to the second user device via the address.

8. A first user device comprising:
a network component;
a first transducer;
a processor; and
a memory that stores instructions that, when executed by the processor, cause the first user device to perform operations comprising:
receiving, via the first transducer, a handoff request from a second user device, wherein the first user device and the second user device are in physical contact with a user, wherein the first user device is in an active data session with a service via a network, wherein the handoff request comprises an address of the second user device and further comprises instructions instructing the first user device to handoff the active data session to the second user device, wherein the second user device generates the handoff request in response to detecting, via a sensor of the second user device, that the second user device is in physical contact with the user, and wherein the handoff request is received by the first user device via a bone conduction signal that is sent by a second transducer of the second user device and that is propagated through a bone of the user in physical contact with the first user device and the second user device, and
initiating handoff of the active data session to the second user device in response to the handoff request.

9. The first user device of claim 8, wherein initiating handoff of the active data session to the second user device in response to the handoff request comprises forwarding, via the network component, the address to the network with a command to transition the active data session to the second user device via the address; and wherein the network receives the command to transition the active data session to the second user device, and the network routes the active data session to the second user device via the address.

10. The first user device of claim 8, wherein initiating handoff of the active data session to the second user device in response to the handoff request comprises forwarding, via the network component, the address to a source with a command to transition the active data session to the second user device via the address; wherein the source provides data associated with the active data session; and wherein the source receives the command to transition the active data session to the second user device, and the source routes the active data session to the second user device via the address.

11. The first user device of claim 8, wherein initiating handoff of the active data session to the second user device in response to the handoff request comprises forwarding, by the network component, the active data session to the second user device via a wireless connection established between the first user device and the second user device.

12. The first user device of claim 8, wherein initiating handoff of the active data session to the second user device in response to the handoff request comprises forwarding, by the network component, the active data session to the second user device via a further bone conduction signal that propagates through the bone of the user.

13. The first user device of claim 8, wherein initiating handoff of the active data session to the second user device in response to the handoff request comprises forwarding, by the network component, a source address of a source to the second user device via a wireless connection established between the first user device and the second user device; wherein the source provides data associated with the active data session; and wherein the second user device contacts the source via the source address and requests that the source handoff the active data session to the second user device via the address.

14. The first user device of claim 8, wherein initiating handoff of the active data session to the second user device in response to the handoff request comprises forwarding, by the first transducer, a source address of a source to the second user device via a further bone conduction signal that propagates through the bone of the user; wherein the source provides data to the first user device associated with the active data session; and wherein the second user device contacts the source via the source address and requests that the source handoff the active data session to the second user device via the address.

15. A method comprising:
  detecting, by a sensor of a user device, that a user is in physical contact with the user device;
  in response to detecting, by the sensor of the user device, that the user is in physical contact with the user device, generating, by the user device, a handoff request, wherein the handoff request comprises an address of the user device and further comprises an instruction directed to a further user device that the user is also in physical contact with and that is in an active data session with a service via a network, the instruction instructing the further user device in physical contact with the user and in the active data session with the service via the network to hand off the active data session to the user device;
  sending, by a transducer of the user device, the handoff request to the further user device via a bone conduction signal that propagates through a bone of the user in physical contact with the user device and the further user device; and
  receiving, by the user device, handoff of the active data session from the further user device.

16. The method of claim 15, wherein receiving, by the user device, handoff of the active data session from the further user device comprises receiving, by the user device, handoff of the active data session from the network.

17. The method of claim 15, wherein receiving, by the user device, handoff of the active data session from the further user device comprises receiving, by the user device, handoff of the active data session from a source, wherein the source provides data associated with the active data session.

18. The method of claim 15, wherein receiving, by the user device, handoff of the active data session from the further user device comprises receiving, by a network component of the user device, handoff of the active data session via a wireless connection established between the user device and the further user device.

19. The method of claim 15, wherein receiving, by the user device, handoff of the active data session from the further user device comprises receiving, by the transducer of the user device, handoff of the active data session via a further bone conduction signal that propagates through the bone of the user.

20. The method of claim 15, wherein receiving, by the user device, handoff of the active data session from the further user device comprises receiving a source address from the further user device, contacting a source of the active data session via the source address, and requesting that the source handoff the active data session to the user device; and wherein receiving the source address from the further user device comprises receiving the source address from the further user device via a wireless connection established between the user device and the further user device or receiving the source address from the further user device via a further bone conduction signal that propagates through the bone of the user.

\* \* \* \* \*